United States Patent
Fowler

(10) Patent No.: US 9,528,746 B2
(45) Date of Patent: Dec. 27, 2016

(54) HEAT EXCHANGER WITH PRINTED HEATER TRACE

(71) Applicant: Hussmann Corporation, Bridgeton, MO (US)

(72) Inventor: Tobey D. Fowler, Maryland Heights, MO (US)

(73) Assignee: Hussmann Corporation, Bridgeton, MO (US)

( * ) Notice: Subject to any disclaimer, the term of this patent is extended or adjusted under 35 U.S.C. 154(b) by 212 days.

(21) Appl. No.: 14/588,674

(22) Filed: Jan. 2, 2015

(65) Prior Publication Data

US 2015/0184927 A1  Jul. 2, 2015

Related U.S. Application Data

(60) Provisional application No. 61/923,018, filed on Jan. 2, 2014.

(51) Int. Cl.
| | |
|---|---|
| *F25D 21/08* | (2006.01) |
| *F28F 19/00* | (2006.01) |
| *F28D 1/047* | (2006.01) |
| *F28F 1/32* | (2006.01) |
| *B23P 15/26* | (2006.01) |

(52) U.S. Cl.
CPC ............ *F25D 21/08* (2013.01); *F28D 1/0477* (2013.01); *F28F 1/32* (2013.01); *F28F 19/006* (2013.01); *B23P 15/26* (2013.01); *Y10T 29/4938* (2015.01)

(58) Field of Classification Search
CPC ........ F25D 21/08; F28F 19/006; F28D 1/0477
See application file for complete search history.

(56) References Cited

U.S. PATENT DOCUMENTS

| | | |
|---|---|---|
| 7,241,131 B1 | 7/2007 | Booth et al. |
| 2006/0120703 A1 | 6/2006 | Tanaka et al. |
| 2007/0000271 A1* | 1/2007 | Lee ...................... F25B 39/022 62/276 |
| 2008/0023175 A1 | 1/2008 | Lehr et al. |
| 2009/0151107 A1 | 6/2009 | Shank et al. |
| 2010/0046934 A1 | 2/2010 | Johnson et al. |
| 2010/0281885 A1 | 11/2010 | Black et al. |

* cited by examiner

*Primary Examiner* — Emmanuel Duke
(74) *Attorney, Agent, or Firm* — Michael Best & Friedrich LLP

(57) ABSTRACT

A heat exchanger for use in a refrigeration system and including a heat transfer coil and fins coupled to the coil to facilitate heat transfer between the coil and a surrounding ambient environment. The heat exchanger also includes a printed heater element that is disposed on one or more of the fins in a non-linear pattern to defrost the coil.

18 Claims, 4 Drawing Sheets

HEAT EXCHANGER WITH PRINTED HEATER TRACE

CROSS-REFERENCE TO RELATED APPLICATIONS

This applications claims priority to U.S. Provisional Application Ser. No. 61/923,013, filed Jan. 2, 2014, the entire contents of which are hereby incorporated by reference.

BACKGROUND

The present invention relates to a heat exchanger, and more particularly, to defrosting the heat exchanger using electrical heat.

Refrigeration systems are well known and widely used in supermarkets and warehouses to refrigerate food product displayed in a product display area of a refrigerated merchandiser or display case. Conventional refrigeration systems include an evaporator, a compressor, and a condenser. The evaporator allows heat transfer between a refrigerant and a fluid passing over coils of the evaporator. The evaporator transfers heat from the fluid to the refrigerant so that the fluid cools the product display area. The refrigerant absorbs heat from the fluid in a refrigeration mode. In the refrigeration mode, the compressor mechanically compresses the evaporated refrigerant from the evaporator and feeds the superheated refrigerant to the condenser, which cools the refrigerant. From the condenser, the cooled refrigerant is fed through one or more expansion valves to reduce the temperature and pressure of the refrigerant, and then the refrigerant is directed through the evaporator.

Since most evaporators in a merchandiser operate at evaporating refrigerant temperatures that are near or lower than the freezing point of water (i.e., 32 degrees Fahrenheit), water vapor from the fluid freezes on the evaporator coils and creates frost. The frost decreases the efficiency of the heat transfer between the evaporator and the fluid (often the fluid is air in a merchandiser), which causes the temperature of the refrigerated space to increase above a desired level. Maintaining the correct temperature of the refrigerated space is important to maintain the quality of the stored food products. To do this, the evaporators must be defrosted regularly in order to reestablish efficiency and proper operation.

Some existing refrigeration systems defrost the evaporator using convection (a heating element that heats the air), which melts the frost over a period of time. This method often results in wasted heat because some of the heated fluid escapes into the product display area, potentially spoiling the food product.

Other conventional refrigeration systems include valves that direct superheated vapor from a discharge line of the compressor into the evaporator to defrost the coils (commonly referred to as "hot gas" defrost). However, the process increases energy costs necessitated by operation of the compressors that compress the superheated vapor. Other conventional refrigeration systems use a process called "reverse gas" defrost where warm refrigerant is directed through the evaporator in a direction opposite refrigerant flow during normal refrigeration mode operation. However, returning the warmed refrigerant to the system can be disruptive to normal operation of the system.

SUMMARY

In one construction, the invention provides a heat exchanger for use in a refrigeration system. The heat exchanger includes a heat transfer coil and fins that are coupled to the coil to facilitate heat transfer between the coil and a surrounding ambient environment. The heat exchanger also includes a printed heater element that is disposed on one or more of the fins in a non-linear pattern to defrost the coil.

In another construction, the invention provides a heat exchanger including plate fins that have tube slots, a serpentine coil coupled to the plate fins, and a printed heater element. The coil has tube sections extending through one or more of the tube slots, and the printed heater element is disposed on one or more of the fins in a pattern that meanders around one or more of the tube slots.

In another construction, the invention provides a method of manufacturing a heat exchanger. The method includes attaching a heat transfer coil to a fin of the heat exchanger, and applying a printed heater element to the fin in a non-linear pattern meandering around one or more of the tube slots. The fin includes one or more tube slots to receive one or more tube sections of the coil.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
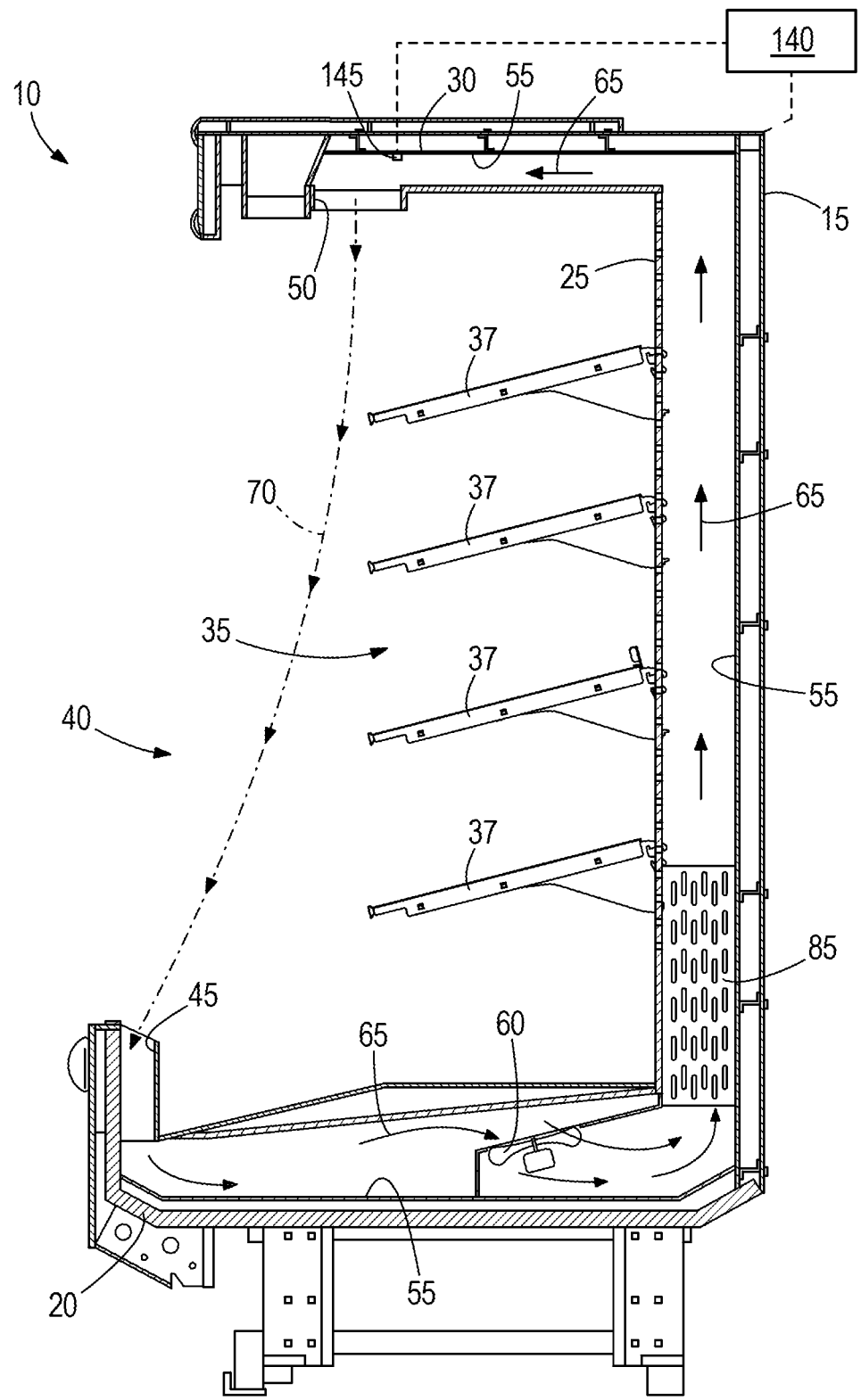
FIG. 1 is a section view of a refrigerated merchandiser including an evaporator embodying the present invention.

FIG. 1 shows one construction of a refrigerated merchandiser 10 that may be located in a supermarket or a convenience store or other retail setting (not shown) for presenting fresh food, beverages, and other food product (not shown) to consumers. The illustrated refrigerated merchandiser 10 includes a case 15 having a base 20, a rear wall 25, and a canopy 30. The area partially enclosed by the base 20, the rear wall 25, and the canopy 30 defines a product display area 35 that stores food product in the case 15 (e.g., on shelves 37) and that is accessible by customers through an opening 40 adjacent the front of the case 15. In the illustrated construction, the merchandiser 10 is a self-contained upright merchandiser with an open front. In some constructions, the merchandiser 10 may include one or more doors positioned over the opening 40 to provide access to the product display area 35. In other constructions, the merchandiser 10 can include a self-contained horizontal merchandiser with an open or enclosed top.

The base 20 includes an air inlet 45 located adjacent a lower portion of the opening 40. The air inlet 45 is positioned to receive surrounding air from within and adjacent the product display area 35 in a substantially vertical direction to direct the surrounding air into the base 20. The case 15 defines an air passageway 55 that provides fluid communication between the inlet 45 and an outlet 50. As illustrated, the air passageway 55 conducts air substantially horizontally through the base 20 from the inlet 45, substantially vertically along the rear wall 25, and substantially horizontally through the canopy 30 to the outlet 50. A fan 60 is coupled to the case 15 to generate an airflow (denoted by arrows 65) within the air passageway 55. The outlet 50 is positioned to discharge the airflow 65 from the air passageway 55 into the product display area 40 adjacent the opening 40 in the form of an air curtain 70.

With continued reference to FIG. 1, the merchandiser 10 includes a refrigeration system (not entirely shown) circulating a heat transfer fluid (e.g., refrigerant, coolant, etc.) to refrigerate product supported in the product display area 35. In particular, the refrigeration system includes a heat exchanger or evaporator 85 (referred to herein as an "evaporator" for purposes of description only) that is fluidly coupled with a compressor to deliver evaporated refrigerant from the evaporator 85 to the compressor, and is fluidly coupled with a condenser to receive cooled, condensed refrigerant from the condenser. The evaporator 85 is disposed in the passageway 55 to facilitate heat transfer between the refrigerant and air flowing within the passageway 55. Refrigerant in the evaporator 85 absorbs heat, decreasing the temperature of the airflow 65 passing over the evaporator 85. The heated or gaseous refrigerant then exits the evaporator 85 and is directed to the compressor. The refrigerated airflow 65 exiting the evaporator 85 is directed toward the product display area 35 via the passageway 55 and the outlet 50 to maintain product in the product display area 35 at desired conditions.

Figure 2:
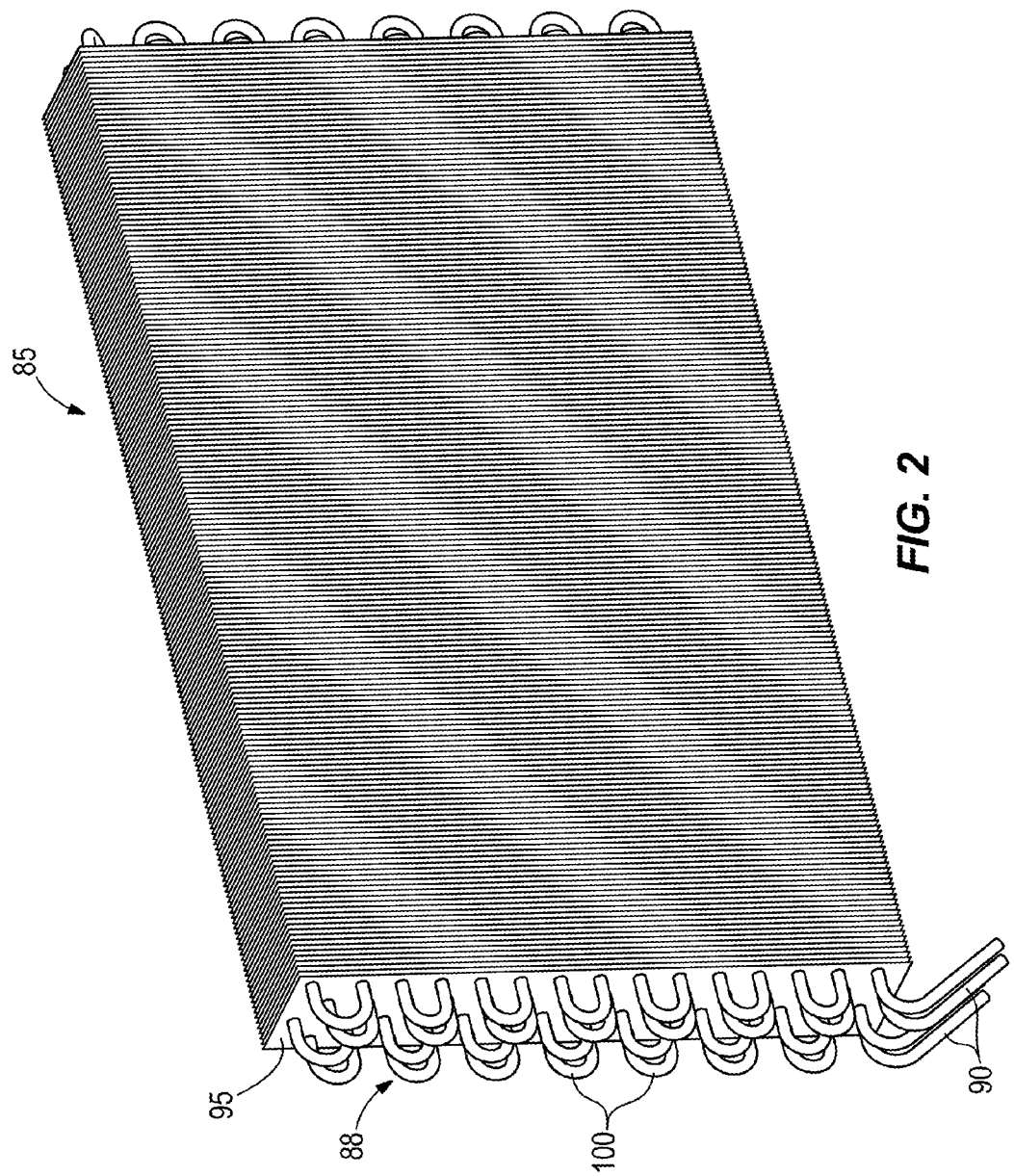
FIG. 2 is a perspective view of the evaporator of FIG. 1 including a coil assembly and fins illustrated without printed heater trace for clarity.

With reference to FIGS. 1 and 2, the evaporator 85 includes a serpentine coil assembly 88 that has a two tubes 90 extending through a plurality of fins 95. The quantity of tubes 90 in the coil assembly 88 can vary (e.g., the coil assembly 88 can have one tube 90 or two or more tubes 90). Refrigerant or coolant from the refrigeration system flows through each tube 90 and heat is absorbed from the airflow 65. Bend portions 100 of the coil assembly 88 couple two tube sections together and redirect refrigerant flowing in one direction through one tube section into another tube section directing refrigerant in another (e.g., opposite) direction.

Figure 3:
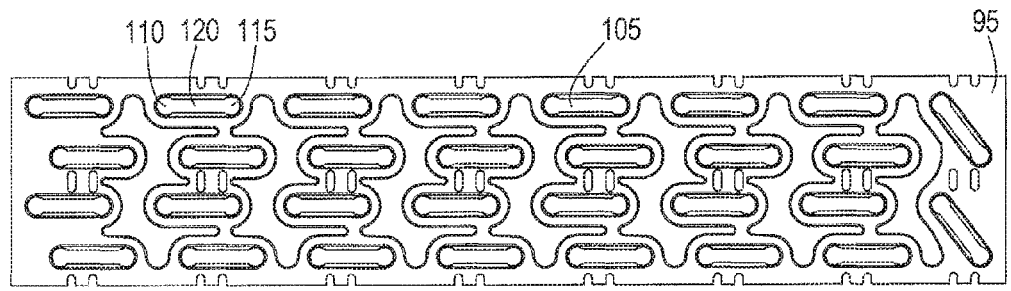
FIG. 3 is an end view of one fin of the evaporator of FIG. 2.

Referring to FIGS. 2 and 3, each fin 95 is defined by a plate structure and includes slots 105 (commonly referred to as "dog bone" slots) disposed through the plate structure. Each slot 105 has a first tube orifice 110 and a second tube orifice 115 spaced from the first tube orifice 110 by an elongated aperture 120. The horizontal and/or vertical spacing between the tubes can be modified, and other tube patterns also can be incorporated into the evaporator 85 (e.g., inline, staggered, angled, etc.).

The merchandiser 10 can be controlled by a control system 140, which evaluates the status of and controls the merchandiser 10 and its components to maintain product display area 35 within the predetermined temperature range. The control system 140 can be located in any suitable location on, adjacent, or even remote from the merchandiser 10, and can be connected to one of more sensors 145 in the merchandiser 1. In addition, the control system 140 can be coupled to a power source to control power provided to the merchandiser 10 or components of the merchandiser 10.

Figure 4:
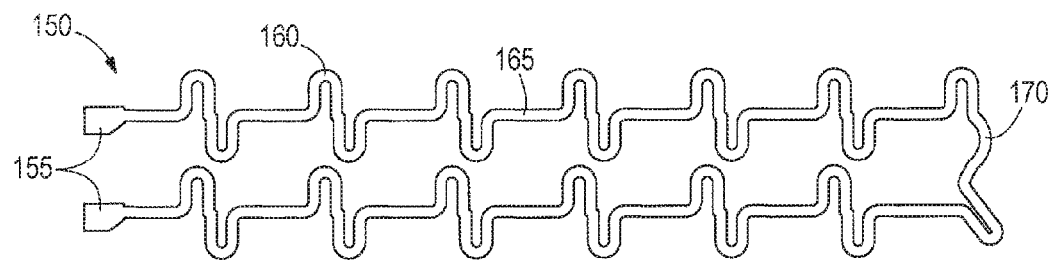
FIG. 4 is side view of an exemplary printed heater trace for the fin of FIG. 3.
Figure 6:
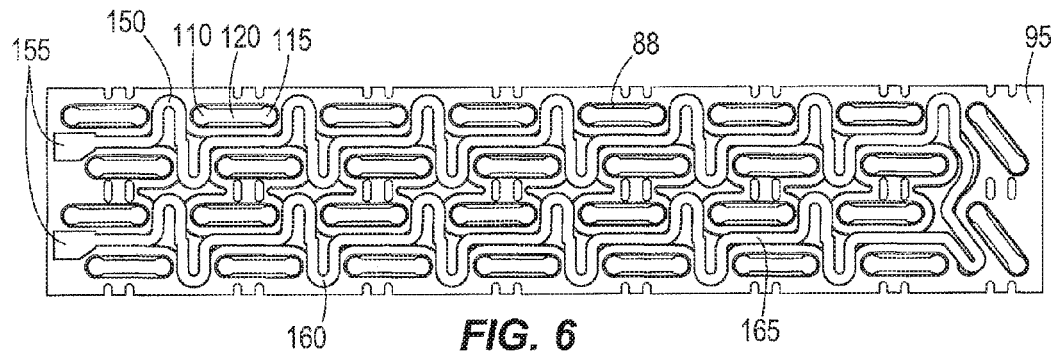
FIG. 6 is a side view of the fin of FIG. 3 including the printed heater trace of FIG. 4.
Figure 7:
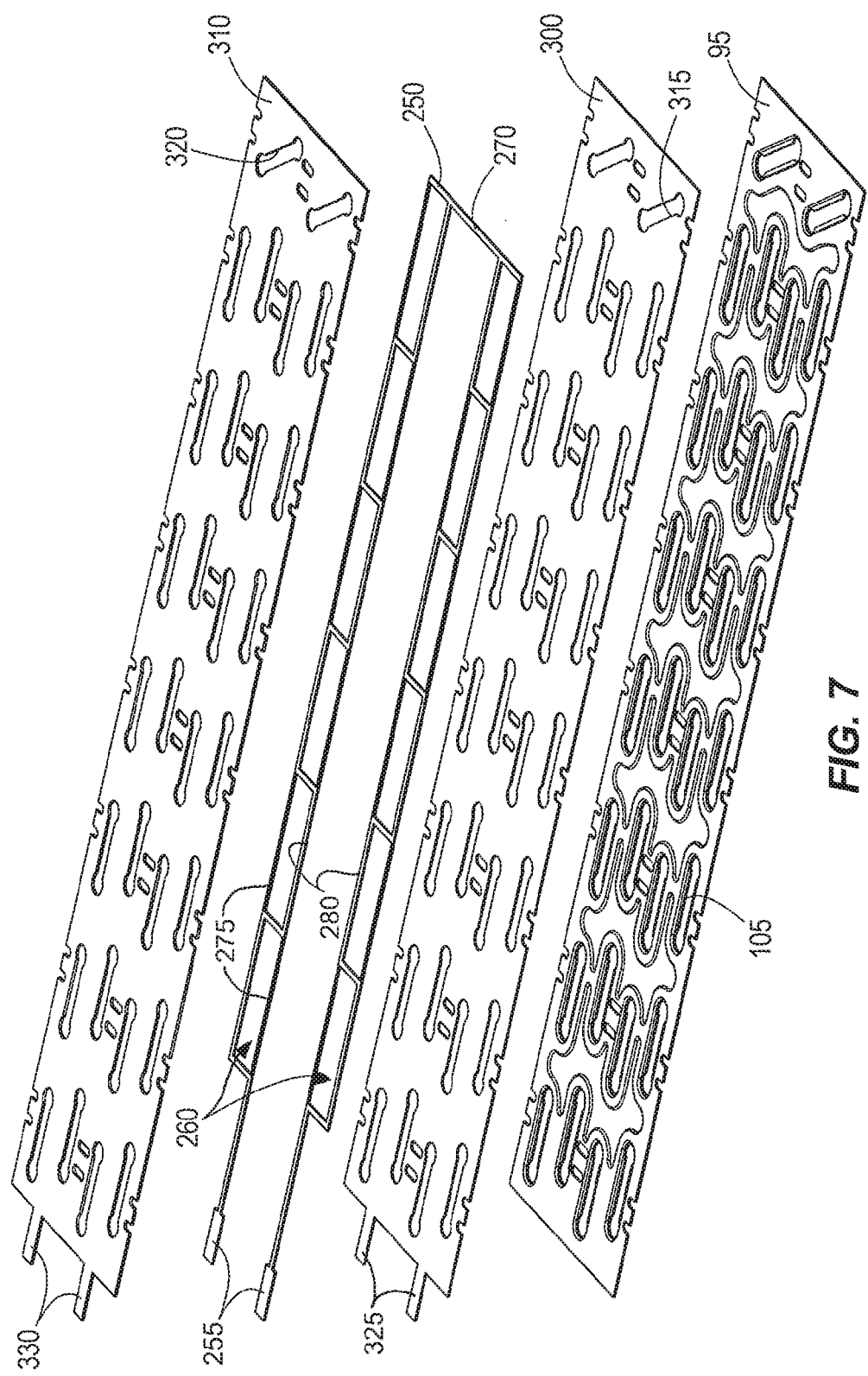
FIG. 7 is an exploded perspective view of one fin, the printed heater trace of FIG. 5, and insulating layers sandwiching the heater trace.

FIGS. 4 and 6 illustrate a printed heater element or heater trace 150 (referred to herein as "printed heater trace" for purposes of description) that is positioned on each fin 95 in a predefined pattern. The printed heater trace 150 can be positioned on fewer than all fins 95 (e.g., one or more) if desired. The illustrated heater trace 150 is an electrically resistive trace that is printed with conductive ink. The predefined pattern is determined by the projected (e.g., modeled) frost profile for the evaporator 85 and can include several heater traces on each fin 95. As shown in FIG. 6, only one heater trace 150 is positioned on the fin 95.

The printed heater trace 150 includes electrical connections 155 that connect the printed heater trace 150 to one or both of the power source and the control system 140. The illustrated printed heater trace 150 starts at one electrical connection 155 located at an edge of the fin 95 and extends between adjacent slots 105 along one side of the fin 95 (e.g., along a pseudo-serpentine path that touches the voids between the slots 105) before returning in a similar manner to the other electrical connection 155 on the same edge of the fin 95. While the electrical connections 155 are illustrated on the same edge of the fin 95, the electrical connections 155 can be located anywhere on the fin 95 (e.g., on the same edge, different edges, or elsewhere).

The illustrated printed heater trace 150 has a zigzag pattern defined by a plurality bend sections 160 (e.g., U-shaped) that join spaced apart straight sections 165. An end section 170 joins the two length-wise extending portions of the trace 150. With reference to the exemplary fin 95 and heater trace 150 illustrated in FIG. 6, the straight sections 165 generally extend along the longitudinal direction of the fin 95 between laterally adjacent slots 105 (i.e. slots 105 that are spaced apart in the lateral direction of the fin 95). The bend sections 160 extend along the lateral direction of the fin 95 and are disposed between longitudinally-adjacent slots 105 (i.e. slots 105 that are spaced apart in the longitudinal direction). This pattern increases the amount of the fin 95 that is covered by the heater trace 150 to increase the resistive heat that can be used to defrost the evaporator 85. In general, the pattern defined by the heater trace 150 can take any form based at least in part on the defrost profile for the evaporator 85. That is, the pattern takes into account the composition of the conductive ink as well as the resistivity of the ink (affected by width, length, depth of the ink, and possibly other factors) and is selected so that the evaporator 85 can be efficiently defrosted. For some evaporators, the illustrated zigzag pattern for the heater trace 150 places the resistive path in close proximity to or at the areas of the evaporator 85 that are most susceptible to frost. The illustrated heater trace pattern is only exemplary, and it should be understood that many other patterns are possible and considered herein.

Figure 5:
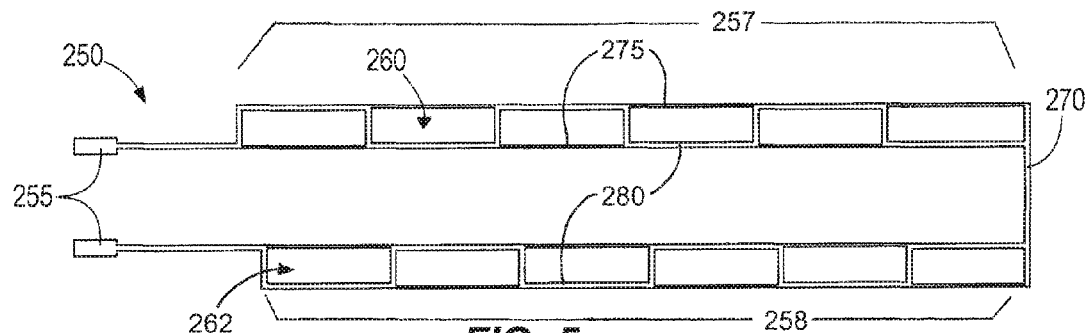
FIG. 5 is a side view of another exemplary printed heater trace for the fin of FIG. 3.

For example, FIG. 5 illustrates another printed heater trace 250 that can be used on the fins 95. The printed heater trace 250 includes electrical connections 255 that connect the printed heater trace 150 to one or both of the power source and the control system 140. As illustrated, the printed heater trace 250 starts at one electrical connection 255 located at an edge of the fin 95 and has a primary trace 257 extending lengthwise along the fin 95. The illustrated heater trace 250 is defined by several rectangular outline regions 260 that surround some of the slots 105 (e.g., the laterally outermost slots) and the coil sections extending through the slots 105. A bridge 270 joins the primary trace section 257 to a secondary trace section 258 of the heater trace 250 extending parallel to the primary trace section 257. The illustrated second trace section 258 also is defined by several rectangular outline regions 262 that surround some of the slots 105 (e.g., the laterally outermost slots) and the coil sections extending through the slots 105. Additional or fewer heater trace sections can be used depending on the desired defrost characteristics or heater trace design intent for the evaporator 85 (e.g., optimization of defrost vs. maximum coverage vs. redundancies).

The heater trace 150, 250 can be made using a printed process or a roll-to-roll process. With the printed process, the heater trace 150, 250 is applied to a finished fin 95 (i.e. a fin 95 that has the slots 105. With the roll-to-roll process, the heater trace 150, 250 is printed onto raw fin material that is fed from a roll onto a processing machine (e.g., dye, tool, stamp, punch press, etc.). This produces an output roll with the combined fin and heater trace.

With reference back to FIG. 5, for example, the illustrated heater trace 250 incorporates electrical circuit redundancies by providing sections of trace with different resistance values. More specifically, the heater trace 250 has low resistivity trace sections 275 (represented by relatively thin lines), and higher resistivity trace sections 280 (represented by relatively thick lines). As illustrated, the low and higher resistivity trace sections 275, 280 cooperatively define the rectangular outline regions 260, 262 that circumnavigate one or more slots 105, and the low resistivity trace sections 275 form one side of the respective rectangular outline regions 260, 262 in an alternating pattern. That is, the higher resistivity trace sections 280 define a pseudo-serpentine or meandering path along the longitudinal direction of the fin 95, and the low resistivity trace sections 275 bridge or connect longitudinally-aligned higher resistivity sections 280 to form the closed outline regions 260, 262 surrounding the slots 105. The varied resistivity sections 275, 280 define different resistive flow paths that reduce, and possibly eliminate, the likelihood that a fin with the heater trace 250 becomes defective during the forming process (or during transport or use). For example, the heater trace 250 maintains continuity of at least one resistive path between the connections 255 even when a portion of one or more resistive paths are damaged, broken, or otherwise disabled (e.g., when the slots 105 are formed).

In general, the printed heater trace 150, 250 includes a first dielectric layer 300 applied to a surface of the fin 95. The first dielectric layer 300 is adhered (e.g., glued) to the fin 95. The conductive ink of the heater trace 150, 250 is positioned on top of the dielectric layer 300, and a second dielectric layer 310 is placed over the conductive ink and adhered to the first dielectric layer 300 so that the heater trace 150, 250 forms a heater element encapsulated by the dielectric layers 300, 310. In some cases, all layers of the heater trace 150, 250 can be printed directly onto the fin 95 in the same process, rather than stepwise as described above. The dielectric layers 300, 310 insulate the heater trace 150, 250 to avoid corroding the trace 150, 250, electrical hazard, and degradation from use (e.g., cleaning agents, acids, etc.).

The illustrated dielectric layers 300, 310 substantially cover the fin 95, although each layer 300, 310 includes respective cutouts 315, 320 to accommodate the coil sections extending through the fin 95. Also, each dielectric layer 300, 310 has respective tabs 325, 330 to accommodate and support the electrical connections 155, 255. Although not shown, heater trace with other patterns can be installed on the fin 95 in a similar manner. In some constructions, the dielectric layers 300, 310 can cover a smaller portion of the fin 95.

Generally, the evaporator 85 is assembled by passing each fin 95, with or without the heater trace 150, 250 and the dielectric layers 300, 310, over the coil assembly 88 so that the bend portions 100 extend through corresponding slots 105. The fins 95 are spaced a small distance apart from each other (e.g., using spacers, not shown) so that air can pass in the gaps over the fins 95.

Power can be selectively applied to the printed heater trace 150, 250 via the electrical connections 155, 255 to inhibit frost on or defrost the fins 95. In constructions of the evaporator 85 with several (or all) fins 95 having printed heater trace 150, 250, defrost can still occur even when one or a few heater trace 150, 250 fail to apply sufficient heat. Also, the printed heater trace 150, 250 is placed on the fins 95 in a pattern that minimizes waste heat and pinpoints or focuses the heat in the areas most susceptible to frost conditions. In addition, the control system 140 can control which printed heater trace 150, 250 is active for a selected defrost operation to further reduce operating costs associated with defrost. In this regard, the resistivity of each heater trace 150, 250 on the fins 95 can be quantified and used to provide feedback to the control system 140. This resistivity feedback can be used to better understand the state of the coil 88 (i.e. the amount or level of frost accumulation at any given time). By more accurately knowing the state of the coil 88, adjustments can be made to the timeframe for and/or the amount of heat applied to defrost the evaporator 85 to more efficiently defrost the evaporator 85.

Various features and advantages of the invention are set forth in the following claims.

The invention claimed is:

1. A heat exchanger for use in a refrigeration system, the heat exchanger comprising:
   a heat transfer coil;
   fins coupled to the coil to facilitate heat transfer between the coil and a surrounding ambient environment, each of the fins elongated in a longitudinal direction; and
   a printed heater element disposed on one or more of the fins in a non-linear pattern to defrost the coil, the printed heater element having a first portion extending longitudinally from adjacent a first end of the one or more fins to adjacent a second end of the one or more fins, the printed heater element having a second portion connected to the first portion and extending longitudinally from adjacent the second end to adjacent the first end.

2. The heat exchanger of claim 1, wherein the fins include tube slots and the coil includes a serpentine tube that has tube sections extending through the tube slots, and wherein the printed heater element is disposed adjacent at least some of the tube slots.

3. The heat exchanger of claim 2, wherein the printed heater element meanders along the longitudinal direction of the fin to which the printed heater element is applied such that the printed heater element is disposed between laterally-adjacent tube slots and between longitudinally-adjacent tube slots.

4. The heat exchanger of claim 3, wherein the printed heater element includes a resistive heater trace having a first section with a first resistance value and a second section with a second resistance value that is different from the first resistance value.

5. The heat exchanger of claim 4, wherein the first section defines a pseudo-sinusoidal pattern and the second section connects longitudinally-aligned first sections to completely surround one or more tube slots.

6. The heat exchanger of claim 1, wherein the printed heater element includes an electrically conductive ink.

7. The heat exchanger of claim 1, wherein the printed heater element has two electrical connections disposed along the same edge of the fin.

8. The heat exchanger of claim 1, wherein the fins include tube slots through which the coil extends, wherein the non-linear pattern includes straight sections and bend sections connecting different straight sections, wherein the straight sections extend longitudinally between laterally-adjacent slots, and wherein the bend sections extend laterally between longitudinally-adjacent slots.

9. The heat exchanger of claim 1, wherein the fins include tube slots, and wherein the printed heater element is disposed on at least two sides of one or more of the slots of the corresponding fin to which the printed heater element applied.

10. The heat exchanger of claim 1, wherein the printed heater element includes
a first dielectric layer applied to a surface of the fin;
a conductive ink applied onto the first dielectric layer; and
a second dielectric layer positioned over the conductive ink and the first dielectric layer,
wherein the second dielectric layer is adhered to the first dielectric layer to encapsulate the conductive ink between the first dielectric layer and the second dielectric layer.

11. The heat exchanger of claim 1, wherein the non-linear pattern is defined by a meandering pattern that includes straight sections and bend sections connecting different straight sections, wherein the straight sections extend longitudinally between laterally-adjacent slots, and wherein the bend sections extend laterally between longitudinally-adjacent slots.

12. A heat exchanger for use in a refrigeration system, the heat exchanger comprising:
plate fins including tube slots;
a serpentine coil coupled to the plate fins and including tube sections extending through one or more of the tube slots; and
a printed heater element including a resistive heater trace disposed on one or more of the fins, the resistive heater trace having a first section defining a pseudo-sinusoidal pattern and a second section that connects longitudinally-aligned first sections to surround one or more of the tube slots.

13. The heat exchanger of claim 12, wherein the printed heater element meanders along a longitudinal direction of the fin to which the printed heater element is applied such that the printed heater element is disposed between laterally-adjacent tube slots and between longitudinally-adjacent tube slots.

14. The heat exchanger of claim 12, wherein the first section has a first resistance value and the second section has a second resistance value that is different from the first resistance value.

15. The heat exchanger of claim 12, wherein the printed heater element includes
a first dielectric layer applied to a surface of the fin;
a conductive trace applied to the first dielectric layer; and
a second dielectric layer positioned over the conductive trace and the first dielectric layer,
wherein the first and second dielectric layers encapsulate the conductive trace.

16. The heat exchanger of claim 12, wherein each of the fins includes printed heater elements.

17. A method of manufacturing a heat exchanger, the method comprising:
attaching a heat transfer coil to a fin of the heat exchanger, the fin including one or more tube slots to receive one or more tube sections of the coil; and
applying a printed heater element to the fin in a non-linear pattern meandering around one or more of the tube slots and extending longitudinally from adjacent a first end of the fin to adjacent a second end of the fin, and extending from adjacent the second end of the fin back toward the first end of the fin.

18. The method of claim 17, further comprising
applying a first dielectric layer to a surface of the fin;
applying a conductive trace onto the first dielectric layer; and
applying a second dielectric layer onto the conductive trace and the first dielectric layer.

* * * * *